US007403779B2

(12) United States Patent
De Cambray-Mathan

(10) Patent No.: US 7,403,779 B2
(45) Date of Patent: Jul. 22, 2008

(54) METHOD FOR ANALYZING AND / OR OPTIMIZING A CELLULAR MOBILE TELECOMMUNICATION NETWORK

(75) Inventor: Béatrix De Cambray-Mathan, Paris (FR)

(73) Assignee: Evolium S.A.S., Paris (FR)

( * ) Notice: Subject to any disclaimer, the term of this patent is extended or adjusted under 35 U.S.C. 154(b) by 210 days.

(21) Appl. No.: 10/403,058

(22) Filed: Apr. 1, 2003

(65) Prior Publication Data
US 2003/0190917 A1  Oct. 9, 2003

(30) Foreign Application Priority Data
Apr. 3, 2002  (EP)  ................... 02360116

(51) Int. Cl.
*H04Q 7/20*  (2006.01)
(52) U.S. Cl. ................... 455/446; 455/456.1; 455/456.5
(58) Field of Classification Search ........... 455/446, 455/456.5, 456.1
See application file for complete search history.

(56) References Cited

U.S. PATENT DOCUMENTS

| 5,434,798 | A | | 7/1995 | Madebrink et al. | |
|---|---|---|---|---|---|
| 5,561,841 | A | * | 10/1996 | Markus | ........................ 455/446 |
| 5,960,352 | A | | 9/1999 | Cherpantier | |
| 6,950,656 | B1 | * | 9/2005 | Bahk et al. | ................... 455/436 |
| 2002/0009992 | A1 | * | 1/2002 | Jensen | ........................ 455/422 |
| 2003/0153331 | A1 | * | 8/2003 | Alger | ........................ 455/456 |
| 2005/0079878 | A1 | * | 4/2005 | Smith et al. | .............. 455/456.5 |

FOREIGN PATENT DOCUMENTS

| AU | A-20078/97 | 11/1997 |
|---|---|---|
| EP | 1098544 A2 | 5/2001 |
| WO | WO 92/21182 | 11/1992 |
| WO | WO 01/45441 A2 | 6/2001 |

OTHER PUBLICATIONS

A. Wacker et al, "Static Stimulator for Studying WCDMA Radio Network Planning Issues", Vehicular Technology Conference, 1999 IEEE 49th Houston, Texas, USA May 16-20, 1999, IEEE US May 16, 1999, pp. 2463-2440, XP010342261.

* cited by examiner

*Primary Examiner*—Quynh H Nguyen
(74) *Attorney, Agent, or Firm*—Sughrue Mion, PLLC

(57) ABSTRACT

A method is provided for analyzing and/or optimizing a cellular mobile telecommunications network and to an operation and maintenance center for a cellular mobile telecommunications network. The method includes providing of first data being indicative of a first telecommunication traffic condition for at least one of the cells of the telecommunications network, providing of second data being indicative of location information of the at least one of the cells, for providing of third data being indicative of location information of mobile telecommunication devices within the at least one of the cells, and determining a distribution of a telecommunication traffic condition within the at least one of the cells based on the first, second and third data.

7 Claims, 3 Drawing Sheets

METHOD FOR ANALYZING AND / OR OPTIMIZING A CELLULAR MOBILE TELECOMMUNICATION NETWORK

The invention is based on a priority application EP 02 360 116.4 which is hereby incorporated by reference.

FIELD OF THE INVENTION

The present invention relates to the field of analyzing and optimizing of cellular mobile telecommunications networks, and more particularly without limitation, to radio network optimization and network planning.

BACKGROUND AND PRIOR ART

Network planning for a cellular mobile telecommunications network, such as the GSM or UMTS systems, is a complex task. "The GSM System for Mobile Communications" written and published by M. B. Pautet and M. Mouly, 1992 edition, provides an overview concerning the considerations for network planning.

U.S. Pat. No. 5,960,352 shows a multilayer cellular mobile radio network with optimized frequency re-use plan and a method of optimizing frequency use when adding any microcell base station defining a given microcell that is part of a coverage area of a given macrocell which includes the step of allocating to said microcell a control frequency identical to a traffic frequency used in a macrocell immediately adjacent said given macrocell.

From WO 92/21182 a method is known for optimizing a mobile radio network which is in service, together with a device intended for this. According to that method, it is determined whether an error exists in the network, by monitoring the mobile radio network with an operations and maintenance center. If an error occurs, actual data is retrieved from the mobile radio network in order to calculate nominal data for optimizing the parameter settings in the mobile radio network. The device for carrying out this method is the operations and maintenance center itself.

Australian patent AU-A-20078/97 shows a method for optimising a mobile radio network. In accordance with this proposal a control loop is constructed which contains the operations and maintenance center (OMC) and the processor-controlled device (NPT), which is basically intended for the planning of radio networks. According to this proposal the device, which is a so-called Network Planning Tool, is thereby used as a network optimisation tool.

From the prior art planning solutions for specific capacity, coverage and business needs of a cellular mobile telecommunications network are known. For example the A 956 RNO network optimisation tool chain which is commercially available from Alcatel can be utilized for such purposes. This tool has the ability to determine the geometric contours of cells by using polygons (referred to as "Voronoi" polygons). A variety of other radio network optimisation (RNO) tools is available from other companies.

A common disadvantage of prior art RNO tools is that such tools enable network planning or optimization only at the level of granularity provided by the segmentation of the network into cells (cf. The 2000 GSM World Congress, 2 to 4 Feb. 2000 Cannes, Executive Conference Summary, "Case 1—Planning for Quality when Increasing Network Capacity", Yves Bellego, France Telecom Mobiles and Phillipe Keryer, Alcatel, France.)

SUMMARY OF THE INVENTION

These objects are achieved by a method for analyzing and/or optimizing a cellular mobile telecommunications network, the method comprising the steps of:

providing of first data being indicative of a first telecommunication traffic condition for at least one of the cells of the telecommunications network, providing of second data being indicative of location information of the at least one of the cells, providing of third data being indicative of location information of mobile telecommunication devices within the at least one of the cells, determining a distribution of a telecommunication traffic condition within the at least one of the cells based on the first, second and third data.

These objects are further achieved by a computer program product comprising:

first program means for inputting of first data being indicative of a first telecommunication traffic condition for at least one of the cells of a cellular mobile telecommunications network, second program means for inputting of second data being indicative of location information of the at least one of the cells, third program means for inputting of third data being indicative of location information of mobile telecommunication devices within the at least one of the cells, fourth program means for determining a distribution of a telecommunication traffic condition within the at least one of the cells based on the first, second and third data.

These objects are further achieved by an operation and maintenance center for a cellular mobile telecommunications network comprising:

means for providing of first data being indicative of a first telecommunication traffic condition for at least one of the cells of the telecommunications network, means for providing of second data being indicative of location information of the at least one of the cells, means for providing of third data being indicative of location information of mobile telecommunication devices within the at least one of the cells, means for determining a distribution of a telecommunications traffic condition within the at least one of the cells based on the first, second and third data.

The present invention provides for a method for analysing and/or optimising a cellular mobile telecommunications network, in particular for network planning. In essence the invention enables to analyse a cellular mobile telecommunications network at a finer level of granularity then that which is given by the segmentation of the network into cells.

This is accomplished by taking location information of mobile telecommunication devices within the network into consideration. The location information is combined with information on quality of service (QoS) and/or traffic information for each cell. Such integrated cell information can be acquired by means of a state of the art RNO.

In particular, the location information of the mobile telecommunication devices within the network enables to determine the distribution of telecommunication traffic within a given cell.

In accordance with a preferred embodiment of the invention the location information of the mobile telecommunication devices is used to determine motion information of the mobile telecommunication devices. Based on the motion information it can be determined when a handover from one cell to another will occur. This enables to determine those cell boundaries where handovers occur frequently.

In accordance with a preferred embodiment of the invention one or more of the indicator values provided by the RNO is utilized, such as traffic values, mean channel occupation time, call duration average and/or at the busy hour.

In accordance with a further preferred embodiment of the invention the location information of the mobile telecommunication devices is acquired in one or more of the following ways:

Cell-ID

This is the simplest method for determining the location of a mobile. It relies on the hypothesis that the geographical coverage of a cell corresponds to that predicted by radio coverage studies. When an active mobile is connected to a base station, the mobile is assumed to be located geographically within the area predicted to be best served by this base station.

Reliable positioning therefore requires accurate maps of the base station coverage area, which are produced using cellular planning software. It is then necessary to model the maps to transform them into a usable and easily describable format. The Alcatel A956 RNO tool or the Alcatel A955 RNP (Radio Network Planning) tool con be used for this purpose.

In order to determine the location within a cell round trip time (RTT) measurements can be used, i.e. measurements of the time taken by the radio waves to complete a round trip.

It is possible to refine positioning using RTT measurements taken by the base station, which measures the time between the transmission of a frame (from base station to mobile) and the reception of the corresponding frame (from mobile to base station). Using this measurement, the base station can work out the distance to the mobile, with a theoretical accuracy of about 80 m.

Unlike second generation systems, in which a mobile only communicates with a single base station, a third generation mobile terminal can be in communication with several base stations in soft handover situations. An additional difficulty lies in the fact that the base stations for which the mobile is active can change several times a second. A method is therefore needed to identify the cell that best represents the geographical position of the mobile. For example, the mobile may be asked which is the best cell for reception, or statistical processing of the cells used by the mobile can be carried out. The latter solution allows further refinement of the positioning accuracy by determining in which zone of the cell the mobile is located.

The advantage of the Cell-ID approach is low cost of deployment and operation, as well as the fact that it can be implemented across the whole population of mobile users, since no special development is required to the mobile itself.

Triangulation

If the position of two base stations is known accurately, and it is possible to measure the difference in time that the signals transmitted by these stations take to reach the mobile—the System Frame Number (SFN) observed time difference, that is, the time difference observed on the system clock as received from the two base stations—it is then possible to work out a locus (hyperbola) for which this time difference is constant and equal to that measured by the mobile. The estimated position of the mobile is obtained by repeating this operation and taking the intersection of the hyperbolas defined in this way. This method can be combined with the RTT measurement to further increase positioning accuracy.

This triangulation method is more accurate than the method based on cell identification and, in particular, does not depend on correctly predicting the coverage. However, its accuracy is related directly to the time taken for the signals to travel from the base stations, and can therefore be affected by multiple reflections in urban areas. In addition, it requires three base stations to be visible, which may not be the case in a rural area or inside buildings.

The mobile can only measure observed time differences. Differences in signal transit times can only be worked out if the time interval between two base stations (Relative Time Difference; RTD) during transmission is known. Several solutions exist for dealing with this situation:

Synchronize the base stations' transmission relative to a common time reference (GPS type).

Regularly observe and measure the RTD and its drift using dedicated Location Measurement Units (LMU).

Both solutions are relatively costly, either because of the price of the GPS receivers (equipment, layout of site to give a direct view of the sky), or because of the prices of the LMUs, which are expensive to install (site, monitoring). There are two versions of Observed Time Difference (OTD) of Arrival (OTDOA), depending on the role assigned to the mobile:

When the mobile only reports observations of the SFN—SFN observed time difference to the network, with the position calculations being carried out by the network, this is referred to as mobile-station-assisted OTDOA.

It is also possible to transmit the RTD information measured by the LMUs and the positions of the base stations to the mobile. After measuring the SFN—SFN observed time difference, the mobile can calculate its own position independently. This is referred to as mobile-station-based OTDOA.

Satellite

Satellite positioning systems, such as GPS or Galileo, can be used to further improve accuracy.

Terrestrial mobile networks offer the possibility of transmitting support information (e.g. ephemeris, time references or even differential corrections) to these satellite receivers. Using this support data, positioning time (time-to-fix), accuracy and sensitivity are improved considerably. Accuracies to within several meters can be achieved in this way. However, the service is not available inside buildings, unless the user is close to a window. Moreover, this method requires a full satellite receiver (processing+radio) to be integrated into the mobile, which has an adverse impact on the cost.

For the implementation of the acquisition of location information of mobiles the following network elements can be utilized.

Gateway Mobile Location Center (GMLC): Responsible for the interface with the outside world, the 'LoCation Services (LCS) clients', suppliers who are the source of positioning requests. The center receives the positioning request, authenticates the client, and checks that he or she is authorized to request a user location. The GMLC is also responsible for transmitting the required service quality (accuracy, response time, etc) to the network, and for converting the positioning results into the desired format, for example, a different coordinate system.

Serving Mobile Location Center (SMLC): Whether integrated into the Radio Network Controller (RNC) which controls the base stations, or located in a separate network element, the SMLC has the role of determining the position of the mobile, that is, its geographical coordinates plus any potential degree of uncertainty. It is free to choose the positioning method in accordance with the quality of service requested by the GMLC and the capability of the mobile. In addition, the SMLC receives information about coverage and cellular planning when a knowledge of the network geography is needed.

Location Measurement Unit for OTDOA only: The role of the LMUs is to help the SMLC take base station synchronization measurements. LMUs are either integrated into Node B or BTS (B type LMU), or distributed over the network (A type LMU). In the latter case, it is considered that one LMU is required for every three or four base stations.

In addition, the existing network elements have to be modified. The Mobile Switching Center (MSC) has to be capable, in particular, of verifying in the Home Location Register (HLR), that an LCS client is authorized to determine the location of a user, depending on the identity of the LCS client, among other things, and the subscriber profile and options. For positioning methods that require the mobile to be actively in communication, the MSC must also be capable of activating a communication, with or without notifying the subscriber.

The RNC or BSC is also affected, since it has to incorporate the SMLC functions, or even control the SMLC. Lastly, the Node Bs (or BTSs) have to incorporate B type LMUs, and must be able to measure RTTs.

In accordance with a further preferred embodiment of the invention the location information acquired for the mobile telecommunication devices is used to derive motion information and traffic distribution. By means of the motion information it is determined when handovers at cell boundaries occur. This way those cell boundaries can be identified where handovers occur frequently.

In accordance with a further preferred embodiment of the invention the traffic distribution within the cells and/or the handover distribution at the cell boundaries is visualized for a user. For example those regions with a high traffic density and/or handover frequency are highlighted on the display.

In one application a certain predefined number of areas, for example ten areas where the traffic is the highest are highlighted. In response an operator can launch the evaluation of cell creations in these areas. It is also possible to highlight areas with low traffic, such as a predetermined number of ten areas. In response the operator can launch the evaluation of cell deletions and/or modifications.

In accordance with a further preferred embodiment of the invention a graphical user interface is provided for defining regions within cells or the modification, addition or deletion of cells for the purposes of evaluation. The operator selects the location and the shape of the cell to add, create, suppress or modify by means of a graphical input tool.

For this purpose the user selects an area (by zooming and scrolling) on the server map and draws the new cell. The boundary length and the surface of the considered cell are computed from the server map and the cell drawing. The data which has been acquired from the RNO and the location information of the mobile telecommunication devices are used to simulated one or more network conditions for the network modification to be evaluated. Preferably a traffic model is established based on the observed data and used for the purposes of simulation.

In accordance with a further preferred embodiment of the invention the results of the simulation are also visualised and/or outputted in the form of a table.

In accordance with a further preferred embodiment of the invention a computer program implementing the invention is loaded on an operations and maintenance center (OMC).

It is to be noted that the present invention is particularly advantageous in that it enables to take into account the specificity of each network. It is possible to use the present invention in any mobile network as it only needs data collected on the cells of the studied network; such data can be collected by a prior art RNO, in which the proposed method is integrated and by a location module. Hence, the proposed solution does not require data which is not easily available like land usage data, topography etc.

Another advantage of the present invention is that it can be used for any cell type (macro, micro, etc), any area (urban, dense urban, . . . ), and any mobile technology (e.g. GSM, GPRS, UMTS). The present invention enables to determine not only the traffic but also the handover values or other QoS data within a chosen area, or for a new cell. Furthermore, it enables to create, modify or suppress a cell of any shape and with any neighbors and to simulate such a modification.

DETAILED DESCRIPTION

In the following preferred embodiments of the invention are explained in greater detail by making reference to the drawings.

Figure 1:
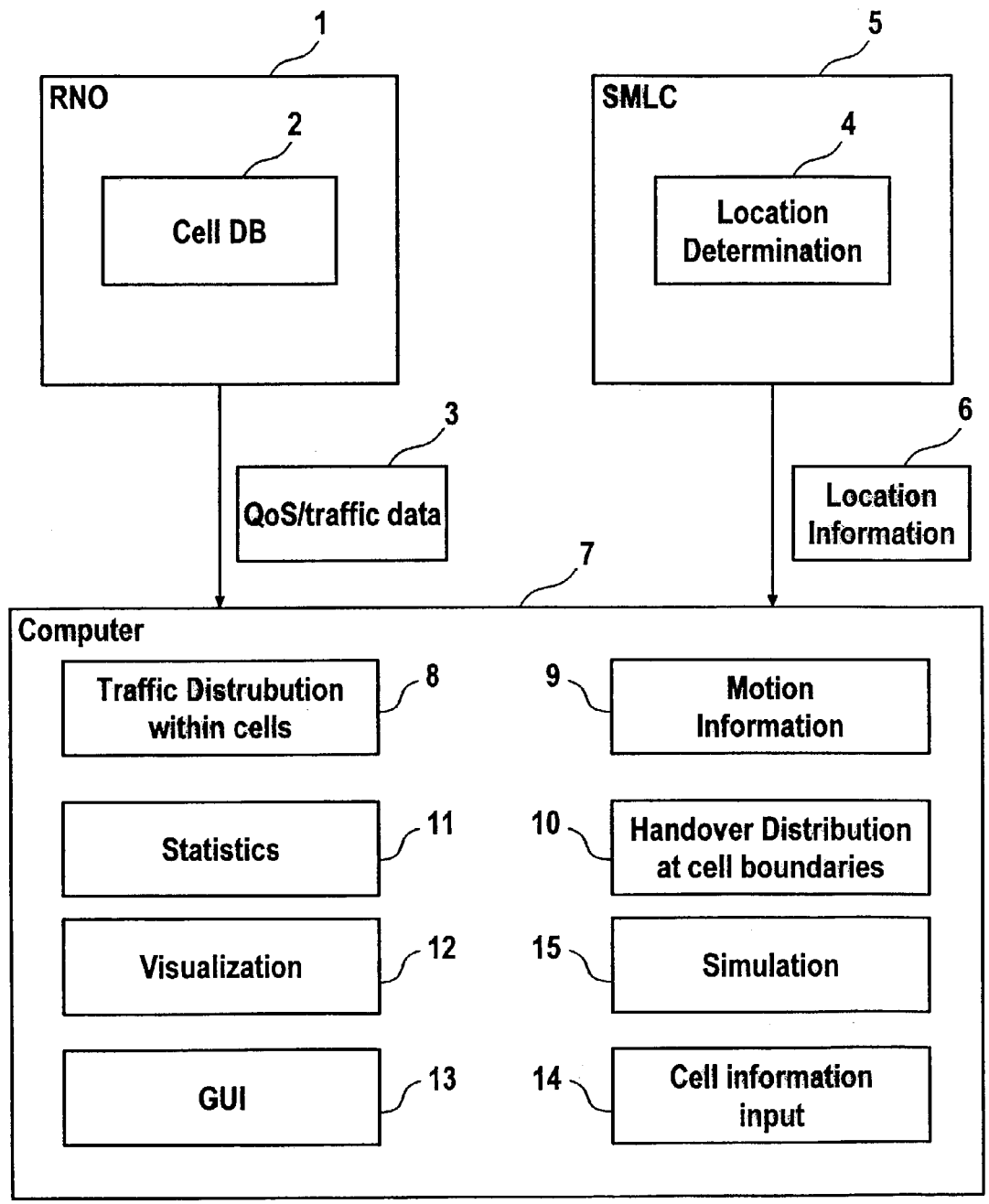
FIG. 1 shows a block diagram of an implementation of the present invention.

FIG. 1 shows a block diagram of a preferred embodiment of a system in accordance with the invention. The system comprises an RNO tool 1. For example the A 956-RNO which is commercially available from Alcatel/EVOLIUM can be utilized as RNO tool 1.

The RNO tool 1 has a cell database 2 which serves to store location, geographic and topology information of the cells of the mobile telecommunications network as well as possible handovers between cells. By means of the RNO tool 1 the operation of the cellular mobile telecommunications system is observed and monitored.

The RNO tool 1 outputs certain indicator values 3 which are descriptive of one or more network conditions, such as the number of incoming or outgoing calls at a given point of time or other traffic values, mean channel occupation time, call duration average, traffic (and duration) values at the busy hour and/or other indicator values. In particular the indicator values 3 can contain data being descriptive of a quality of service (QoS) condition of the network. It is to be noted that the indicator values 3 are indicative of traffic conditions integrated over a given cell but usually do not allow a finer level of granularity. For example it is not possible to determine based on the indicator values 3 alone how the traffic is distributed within a cell.

Further a location determination module 4 is provided. The location determination module 4 can be realized by means of any known location determination technique such as cell-ID with RTT, triangulation or satellite techniques. Preferably the location determination module 4 forms part of serving mobile location center (SMLC) 5.

The location determination module 4 permanently determines the locations of all mobile telecommunication devices within the network or at least for a subset of those devices. The corresponding location information is provided by means of geographic data 6 to a computer program 7 as well as the indicator values 3.

The program 7 has a program module 8 for calculating the traffic distribution within the cells. This is done by evaluating the indicator values per cell and the geographic data 6.

Further the program 7 has a program module 9 for calculation of motion information based on the data 6 which are permanently received within certain time intervals. Based on changing locations of a mobile telecommunication device motion information is derived. This motion information is inputted into program module 10 in order to determine or estimate when handovers occur at cell boundaries. This way it is possible to calculate the distribution of handover frequencies along cell boundaries.

The program 7 further includes a program module 11 for performing statistical evaluations. Those statistical evaluations can form the basis for establishing a traffic model which can be utilized for the purposes of simulation.

The program 7 further has a program module 12 for the visualization of cartographic data, cell boundaries and the traffic distribution within the cells and/or the distribution of handovers at cell boundaries. The program module 12 is coupled to program module 13 which serves to realize a graphical user interface.

By means of the graphical user interface provided by program module 13 a user can select a region within the network to be evaluated. Such a region can cover a certain number of network cells. Within the selected region a user can define new cells, modify cells or delete cells. Information which is descriptive of such modification information is stored by means of program module 14.

The effect of such an envisaged modification of the network is simulated by means of program module 15. For example the simulation is performed based on the traffic module taking into consideration the modified network structure which has been stored by means of program module 14.

Figure 2:
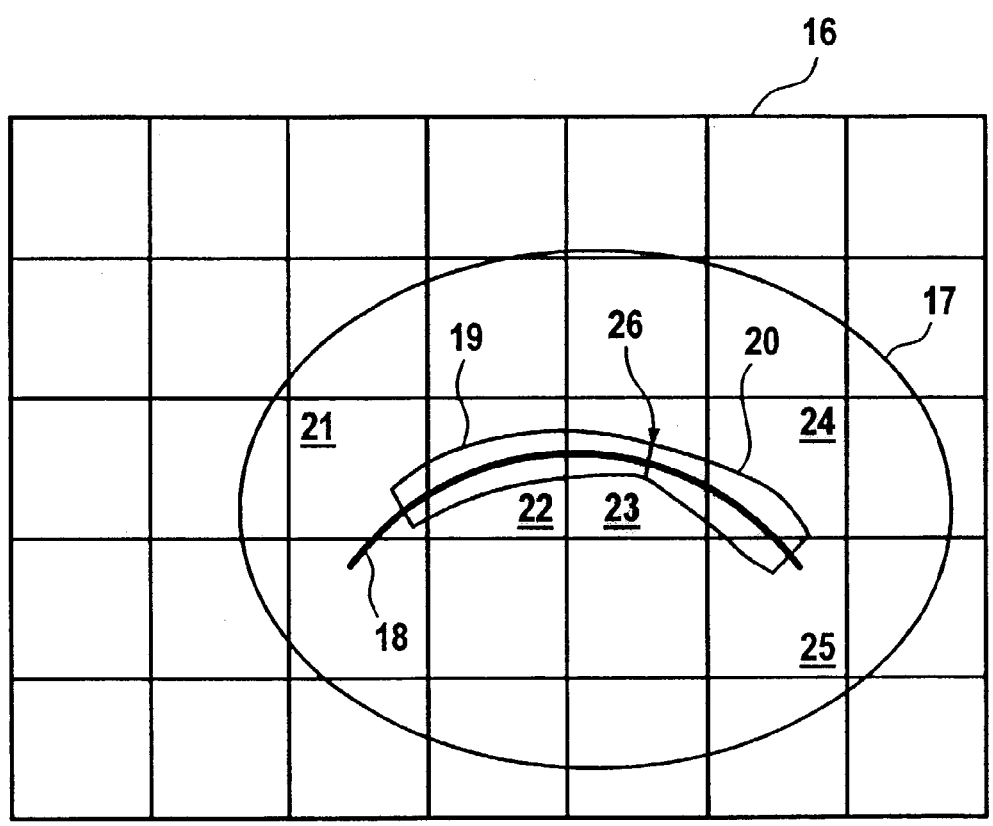
FIG. 2 is illustrative of an application example.

FIG. 2 is illustrative of an application example. The cells of a network are displayed on a computer screen 16 as it is as such known from prior art RNO tools. A user can select a region 17 within the network which contains a number of cells to be evaluated. This selection can be done by means of a graphical input.

In response the indicator values 3 and the location data 6 (cf. FIG. 1) are acquired and the traffic distribution within each of the cells of region 17 is calculated. For example for each cell the integrated traffic within that cell is provided as an indicator value from the RNO tool. The location determination module provides the locations of active mobile telecommunication devices within each of the cells. The location information in combination with the total traffic for a given cells provides the traffic distribution within that cell which can be visualized on screen 16. For example an area having a particularly high number of active mobiles is highlighted on the screen 16. Likewise cell boundaries with a high handover frequency can be highlighted.

In the example considered here there is a motorway 18 which is covered by the cellular mobile telecommunications network. Especially during rush hours there is a large number of users on the motorway 18 with active mobile telecommunication devices. In this case the area defined by the motorway 18 would appear in a highlighted way on the screen 16 to inform the operator about the heavy traffic density.

One of the purposes of network optimization is to minimize the number of handovers between cells as handover operations represent a heavy charge on the radio control channels. This is why an operator may define a number of elongated cells along the motorway 18 in order to reduce the number of handovers which are caused by users driving on the motorway 18.

For example the user can define a new cell 19 and a new cell 20 which cover neighboring regions of the motorway 18 by means of the graphical input tool. The boundaries of the new cells 19 and 20 are also displayed on screen 16.

The cell 19 covers parts of the original cells 21, 22 and 23 and the new cell 20 covers parts of the original cells 23, 24 and 25 of the network. The total traffic for each of the original cells is known from the RNO tool; also the locations and motion of the active mobiles within the original and the new cells is known (cf. data 6, program modules 9 and 10 of FIG. 1). This way it is possible to predict the traffic distribution within the new cells 19 and 20 as well as the number of handovers which would occur at the boundary line 26 between the cells 19 and 20.

Again the result of this simulation can be highlighted visually on screen 16. It is important to note that the envisaged cells 19 and 20 can be of any shape and can have any number of neighbors because of the available data base for the evaluation.

Figure 3:
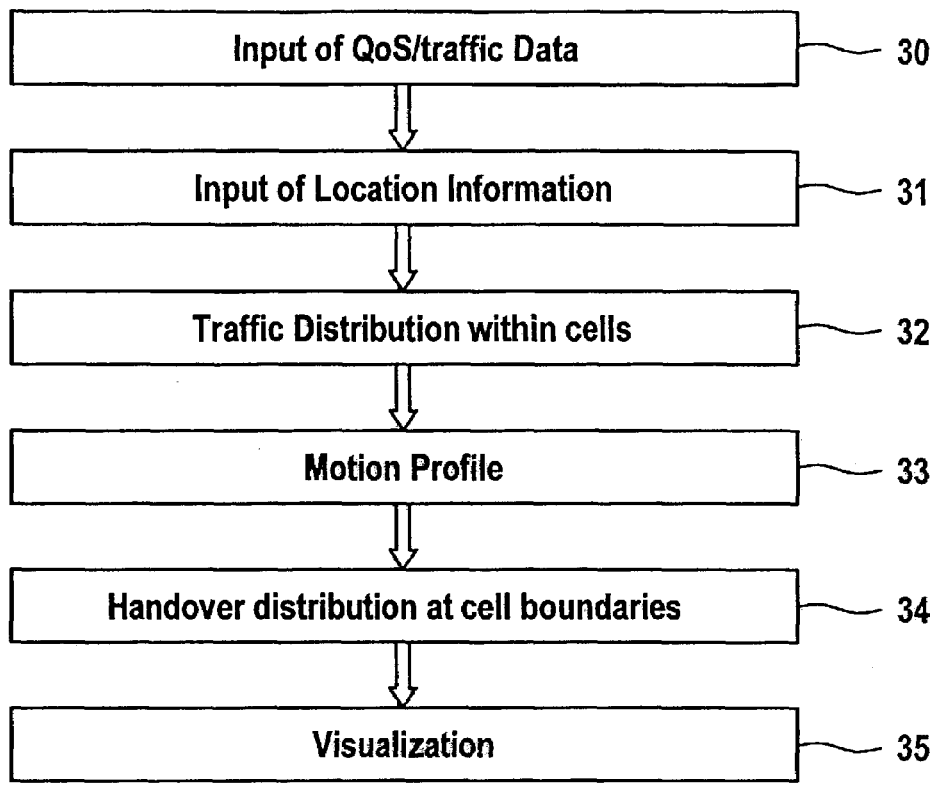
FIG. 3 is illustrative of a preferred embodiment of the method of the invention.

FIG. 3 is illustrative of one embodiment of a method of the invention. In step 30 indicator values from the RNO tool such as QoS and/or traffic data is inputted. In step 31 location information of the active mobile telecommunication devices within the network area to be evaluated is inputted.

In step 32 the traffic distribution within the network area to be evaluated is determined based on the location information provided in step 31 and the indicator values provided in step 30. Alternatively the distribution of another network condition within the cells is determined in step 32.

In step 33 a motion profile of the active mobile communication devices is determined based on the location information which is inputted at subsequent time intervals within step 31. The motion profiles of the active mobile communication devices within the observed network area enable to estimate when a handover occurs for each of the considered mobiles.

The handover distribution at cell boundaries is calculated in step 34. In step 35 the traffic distribution within the cells and/or the handover distribution at the cell boundaries is visualized in order to highlight critical regions within the evaluated portion of the network to a user. For example ten of the areas within the network where the traffic is most important are highlighted as well as the ten regions where there is the lowest traffic.

This information enables a user to consider modifications of the network in an intuitive way and to input those considered modifications by means of a graphical user interface, i.e. by drawing boundary lines of considered cells by means of its computer mouse. It is a particular advantage that a considered modification can be evaluated by means of the existing database due to the location information of the active mobiles or based on a traffic model which has been generated on the basis of data which have been acquired over a certain period.

Figure 4:
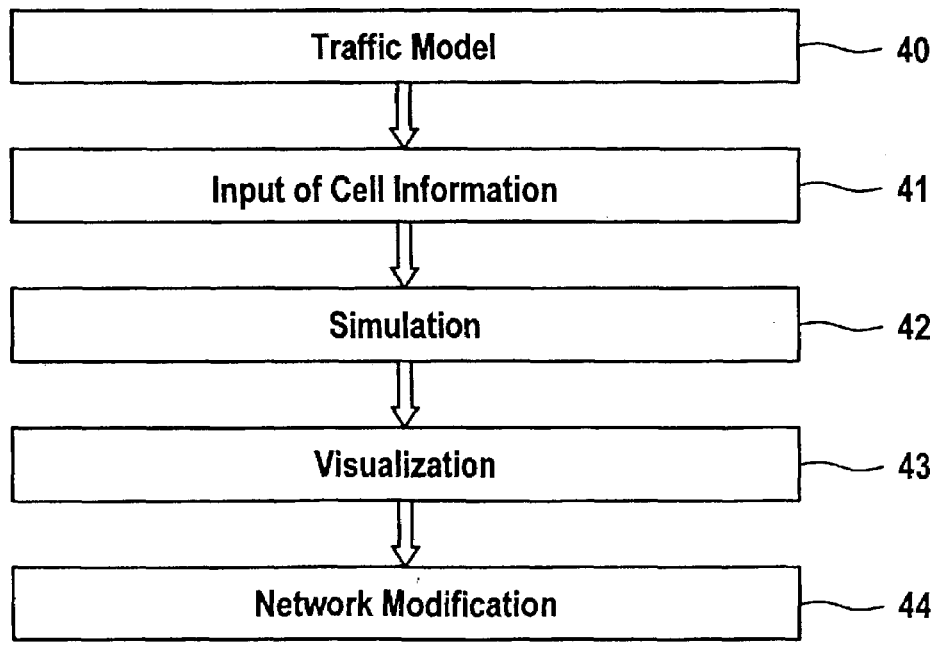
FIG. 4 is illustrative of a further preferred embodiment of the method of the invention.

This aspect is explained in the following in more detail with respect to FIG. 4. In step 40 a traffic model of the network is established which models the distribution of traffic within the cells of the network over time as well as motion profiles.

In step 41 a user inputs cell information, i.e. information concerning the modification of the boundary of an existing cell the edition of a new cell, the deletion of a cell or a combination of such information for a variety of cells of the network. Preferably this is done by means of graphical inputs. The resulting modification of the network is simulated in step 42 based on the traffic model. The result of the simulation is visualized in step 43. If the simulation result is satisfactory the network modification is implemented in step 44.

LIST OF REFERENCE NUMERALS

RNO tool 1
cell database 2
indicator values 3
location determination module 4
SMLC 5
data 6
program 7
program module 8
program module 9
program module 10
program module 11
program module 12
program module 13
program module 14
program module 15
screen 16
region 17
motorway 18
cell 19
cell 20
cell 21
cell 22
cell 23
cell 24
cell 25

The invention claimed is:

1. A method for analyzing or optimizing a cellular mobile telecommunications network, the method comprising the steps of:
   providing of first data being indicative of a first telecommunication traffic condition for at least one of the cells of the telecommunications network,
   providing of second data being indicative of location information of the at least one of the cells,
   providing of third data being indicative of location information of mobile telecommunication devices within the at least one of the cells,
   determining a distribution of a telecommunication traffic condition within the at least one of the cells based on the first, second and third data,
   determining fourth data being indicative of a number of handovers occurring at a cell boundary based on motion information derived from the third data,
   displaying the distribution of the telecommunication traffic condition and number of handovers occurring at a cell boundary, and
   deleting the at least one of the cells if the distribution of the telecommunication traffic condition determines low traffic within the at least one of the cells.

2. The method of claim 1, the first data comprising at least one of integrated telecommunication traffic within the cell, mean channel occupation time of telecommunication links to or from the cell, average call duration of incoming or outgoing calls, and indicator or traffic values at during a particular time period.

3. The method of claim 1, the second information being provided by performing a database access to a database storing cell location or shape information of the telecommunications network.

4. The method of claim 1, the third data being obtained by at least one of cell ID in combination with round trip time measurements, triangulation, and satellite positioning.

5. The method of claim 1 further comprising:
   inputting of cell information via a graphical user interface for modifying the telecommunications network,
   simulating the distribution of the telecommunication traffic condition or handovers at cell boundaries for the modified telecommunication network based on the first, second and third data.

6. The method of claim 5, the simulation being performed by means of a traffic model having been established based on the first, second and third data.

7. An operation and maintenance center for a cellular mobile telecommunications network comprising:
   means for providing of first data being indicative of a first telecommunication traffic condition for at least one of the cells of the telecommunications network,
   means for providing of second data being indicative of location information of the at least one of the cells,
   means for providing of third data being indicative of location information of mobile telecommunication devices within the at least one of the cells,
   means for determining a distribution of a telecommunications traffic condition within the at least one of the cells based on the first, second and third data,
   means for determining fourth data being indicative of a number of handovers occurring at a cell boundary based on motion information derived from the third data,
   means for displaying the distribution of the telecommunication traffic condition and number of handovers occurring at a cell boundary, and
   means for deleting the at least one of the cells if the distribution of the telecommunication traffic condition determines low traffic within the at least one of the cells.

* * * * *